April 26, 1938.  H. F. MERRIAM ET AL  2,115,426
METHOD FOR MAKING A SULPHUR BEARING OIL
Filed Sept. 19, 1935
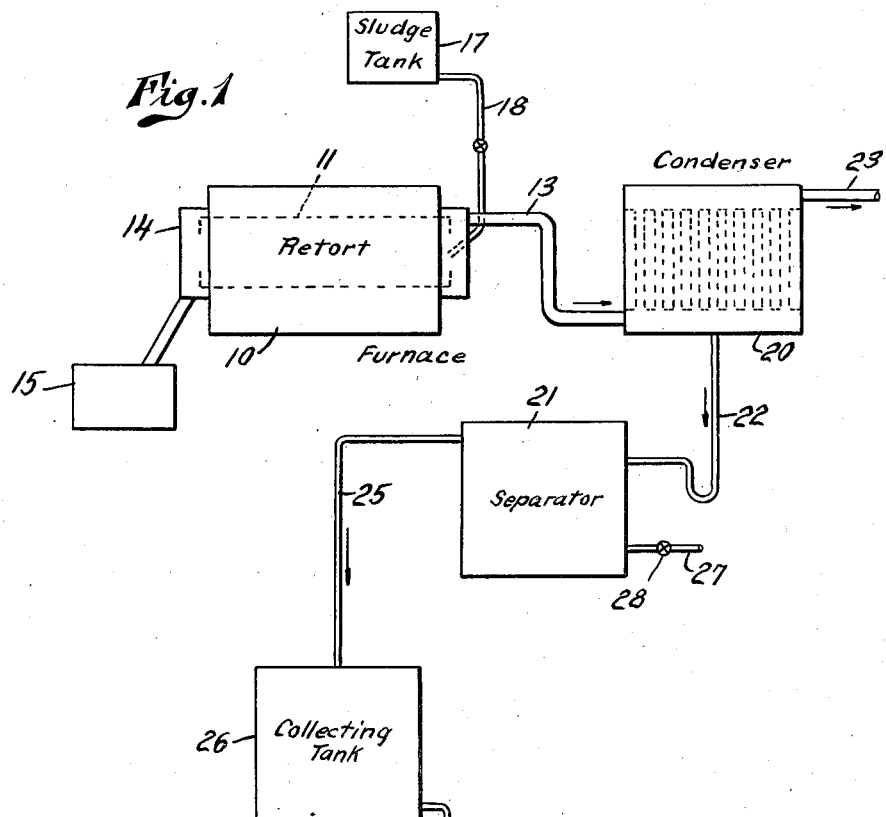
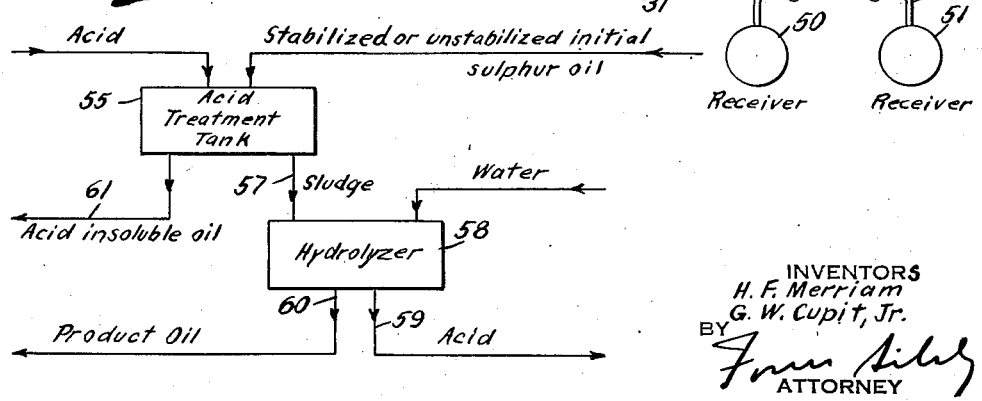
INVENTORS
H. F. Merriam
G. W. Cupit, Jr.
BY
ATTORNEY Patented Apr. 26, 1938

2,115,426

UNITED STATES PATENT OFFICE 2,115,426

METHOD FOR MAKING A SULPHUR BEARING OIL

Henry F. Merriam, West Orange, N. J., and George W. Cupit, Jr., Long Island City, N. Y., assignors to General Chemical Company, New York, N. Y., a corporation of New York Application September 19, 1935, Serial No. 41,190

7 Claims. (Cl. 196—148)

This invention relates to methods for making sulphur bearing oils. More especially, the invention is directed to methods for making sulphur bearing oils derived from sludges formed in oil refining processes in which sulphuric acid is employed.

The principal objects of the invention are directed to provision of improvements in methods for making sulphur bearing oils having sulphur contents substantially higher than those of previous sulphur oils of generally similar character. It is the object of one phase of the invention to provide methods for extracting certain sulphur compounds from sulphur bearing oils, and in this way producing sulphur bearing oils of increased utility. The invention also aims to provide methods for making oils having especially high sulphur content substantially all of which sulphur is in strong chemical combination. Further objects of the invention are to provide methods for making relatively high sulphur oils which are stable and do not become turbid, or deposit sulphur on standing.

In oil refining processes, involving treatment of petroleum distillate oils with sulphuric acid, large quantities of sludges are produced. When destructively decomposed by heating, these sludges form gas mixtures containing water vapor and condensable hydrocarbon vapors, and gases such as sulphur dioxide, carbon dioxide, nitrogen and uncondensable hydrocarbons.

When sludge material, resulting from treatment with sulphuric acid of relatively light hydrocarbon oil distillates containing substantial quantities of sulphur compounds, is dissociated preferably by destructive decomposition by heating to form a hot gas mixture containing hydrocarbon vapors and the gas mixture is cooled, for example to about normal temperature, an oily condensate is obtained which is a sulphur bearing oil apparently containing sulphur constituents and non-sulphur constituents in variable quantities depending largely upon the nature of the original sludge material. In accordance with the invention, it has been found that a sulphur oil of this type may be treated in such a way as to effect a selective separation of a large portion of certain more valuable sulphur constituents from the other sulphur and non-sulphur constituents. More particularly, it has been found that sulphur oils of the kind mentioned may be treated with an acid, for example sulphuric acid, capable of extracting or dissolving certain sulphur constituents of the initial oily condensate and that there results after settling the formation of a layer of sludge containing the extracted or dissolved sulphur constituents, and a layer of unreacted oily material comprising as a rule mostly non-sulphur constituents. After separation of the sludge layer from the unreacted oil layer, the sludge is treated, as by hydrolysis by addition of water, to effect separation of the sulphur bearing oil and the dissolving acid used to dissolve the sulphur bearing constituents out of the initial oily condensate. The dilute acid layer and the sulphur bearing oil layer are separated, as by decantation, thus recovering the sulphur bearing constituents dissolved out of the initial oily condensate by the acid treatment. The oils so produced are stable, as a general rule higher in sulphur than the initial oily condensate, and do not deposit free sulphur or become less effective on standing.

A further appreciation of the objects and advantages of the invention may be had from a consideration of the following description of a preferred method for making the improved high sulphur oils and of the oils produced by such methods. Figs. 1 and 2 of the accompanying drawing illustrate diagrammatically apparatus by which the improved high sulphur oils may be made.

Referring to the drawing, 10 indicates the combustion chamber of a furnace adapted to burn coal, coke, oil, natural gas or other fuel. Mounted in chamber 10 is a decomposing kiln or retort 11 of any desirable construction, for example a fixed shell provided with suitable mechanism such as a screw conveyor, not shown, to facilitate discharge of coke. A rotary retort may also be employed if desired. Preferably an externally heated kiln adapted to substantially exclude admission of air is used. One end of kiln 11 communicates with a gas outlet 13, and the opposite end projects into a header 14 into which the solid residue of the decomposition of the acid sludge is continuously discharged. Header 14 empties into air-lock 15 through which coke may be discharged without admitting air to the kiln. Acid sludges, constituting sources of the sulphur bearing oils of the invention, are run into the kiln from supply tank 17 through a valve-controlled pipe 18. Gas outlet 13 is connected to the lower end of a cooler or condenser 20 of any suitable construction, either air or water cooled, and operated so as to reduce the temperature of the gas stream to substantially normal to condense the bulk of the water vapor and a major portion of condensable hydrocarbons contained in the gas. Condensate from the cooler drains into a separator or collecting tank 21 through a pipe 22 having a liquid seal.

The gases uncondensed in cooler 20, containing principally sulphur dioxide, are discharged through gas line 23, and may be used as desired, for example in the manufacture of sulphuric acid by the contact process.

Separator 21 may be a tank or vat large enough to permit continuous gravity separation of water and oil contained in the condensate discharged from condenser 20. The sulphur bearing hydrocarbon oils of the condensate rise to the top of the mass in the separator, and may be withdrawn continuously or intermittently through pipe 25 discharging into a collecting tank 26. Water settling to the bottom of the separator may be drawn off through pipe 27, controlled by valve 28, and discharged to waste or otherwise disposed of.

The still 30, of any approved construction, may be externally heated by hot combustion gases generated in brickwork setting 31. Raw condensate from collecting tank 26 is run into the still through pipe 38, controlled by valve 39. Vapors generated in the still flow through line 41 to a condenser 43, the condensate of which drains through pipes 45 and 46, into receivers 50 and 51.

The oils of the invention may be made in apparatus such as illustrated in the drawing and described above by operating substantially as follows:

In carrying out the methods of the invention to produce the improved high sulphur bearing oils, acid sludges which may be employed are those resulting from sulphuric acid treatment of light distillate oils obtained from petroleum crudes containing sulphur. The acid sludges utilized are preferably sludges resulting from treatment with sulphuric acid of light hydrocarbon oil distillates such as gasoline and kerosene, containing not less than about 0.15% sulphur, although distillates containing less sulphur may be employed if desired. Illustrative examples of distillate oils from which sludges are produced of a character suitable for use in the present invention are straight-run gasoline distillates containing about 0.15% sulphur or more, and cracked distillate averaging 0.25 to 0.30% sulphur or more.

Sludge material of the type indicated and which may have for example a titratable acidity of 40% to 60% expressed as $H_2SO_4$ is continuously fed into kiln 11 from supply tank 17. The burners in furnace 10 are adjusted to maintain within the kiln temperatures desirably not in excess of about 750° F., as above this temperature the sulphur oils constituting the basis of the improved products tend to be decomposed. The preferred temperatures are about 250° F. at the sludge inlet end, and about 500° F. to 600° F. at the coke outlet end of the kiln.

The sludge, gradually passed through the retort, is relatively gradually heated through the preferred temperature range and is decomposed by the action of heat, and the free and/or combined sulphuric acid of the sludge is reduced to sulphur dioxide by the hydrogen of the hydrocarbons and/or by the carbonaceous matter contained in the sludge. The sludge material is thus dissociated, as by the destructive distillation method indicated, with production of water vapor, and hydrocarbon vapors and sulphur compounds are formed. Residual coke is continuously discharged from the kiln through air-lock 15. The major part of the sulphur oils appears to have been evolved by the time the sludge has reached a temperature of 350–400° F.

The gas resulting from the decomposition of the sludge contains principally water vapor and sulphur dioxide, substantial amounts of condensable hydrocarbons and sulphur compounds and smaller quantities of uncondensable hydrocarbons and gases such as carbon dioxide, carbon monoxide, and nitrogen. For example, one representative sludge having a titratable acidity of about 50% expressed as $H_2SO_4$ yielded on decomposition by destructive distillation about 28% residual coke and a retort gas which, after cooling to about normal temperatures, produced about 6% condensable oils, about 35% water, based on the weight of the sludge, the balance of the retort gas comprising sulphur dioxide, carbon dioxide, carbon monoxide, nitrogen, and uncondensable hydrocarbons and water vapor. As previously noted, according to the preferred method for making the sulphur bearing oils, decomposition of sludges is effected in the kiln substantially in the absence of oxygen and in the absence of other extraneous gases. When so operating, the volume of gas formed is lessened and loss of sulphur oil by volatilization is decreased.

The hot gaseous and vaporous products of decomposition of the sludge are discharged from the kiln and passed through conduit 13 into condenser 20 in which the gases are cooled to substantially normal temperatures. Cooling may be accomplished by circulating through the condenser in indirect heat exchange relation with the retort gas mixture any suitable cooling liquid or gas. In place of the condenser illustrated in the drawing, a vertical tower having a spray head at the top for introduction of water may be employed. In such cases, the retort gas mixture is introduced into the bottom of the tower and flows upwardly, intimately contacting and mingling with the downwardly directed spray of water fed in at the top of the tower. The amount of cooling water introduced is so controlled as to cool the exit gases leaving the top of the tower to about normal atmospheric temperatures.

During cooling of the retort gas mixture in the condenser 20, substantially all of the water vapor and the major portion of the condensable hydrocarbon vapors and sulphur compounds are condensed out of the gas stream. The condensate of cooler 20, containing varying proportions of water and liquid hydrocarbons and sulphur compounds, is drained through pipe 22 into separator 21. In the latter, the oils rise to the top of the liquid mass in the tank, and may be intermittently or continuously withdrawn through pipe 25 into tank 26 for collecting what may be termed a raw condensate or initial sulphur oil. The water settling to the bottom of the separator 21 may be discharged from the system through pipe 27.

The oil collecting in tank 26 is a sulphur bearing oil containing generally from about 3 to about 22% sulphur, apparently in strong chemical combination. It will be understood the sulphur content of this condensate may vary considerably in accordance with the characteristics of the initial crude oils and of the acid sludges produced on treatment of the hydrocarbon oil distillates with sulphuric acid. For example, an acid sludge formed through sulphuric acid treatment of a straight-run gasoline yielded an oil condensate of 12% by weight of the sludge, the condensate analyzing 14.8% sulphur. A cracked distillate sludge yielded 10% by weight of oil condensate having a sulphur content of 7.5%. In another instance, a cracked distillate averaging about .25 to .30% sulphur produced on treatment with sulphuric acid a sludge which, on treatment in accordance with the present method, yielded 10.8% by weight of oil condensate analyzing 20.8% sulphur. For convenience in the following discussion, crude sulphur bearing oils of the kind just described are referred to herein as initial sulphur oils.

Initial sulphur oils of the type described contain sulphur constituents and non-sulphur constituents in varying quantities. In accordance with the invention it has been found that sulphur oils of this kind may be treated with an acid, for example sulphuric acid, in such a way as to bring about a selective separation of certain sought for sulphur constituents from other sulphur and non-sulphur constituents. Such separation treatment, in addition to effecting separation of more valuable sulphur constituents from other sulphur and non-sulphur constituents of the oils, in most instances results in production of oils having substantially higher sulphur content than the initial sulphur oils or condensates and containing all or almost all of the sought for sulphur constituents of the initial sulphur oils. The high sulphur oils resulting from such acid treatment and constituting the product oils of this invention for convenience may be termed refined oils, or purified or concentrated or extracted oils.

The separation treatment of an initial sulphur oil to produce a refined oil (one such treatment being hereinafter described in detail) may be applied if desired directly to an initial sulphur oil as recovered in tank 26. However, the initial oil in this state contains appreciable quantities of foreign matter, such as coke-dust and tars, which under most circumstances may be desirably removed. Separation of foreign matter from the initial oil may be effected by distilling the initial oil producing a coke or asphalt-like still residue and distillate or condensate which may be termed an unstabilized distillate oil. If desired, the separation treatment referred to may be applied to the sulphur bearing oil of tank 26 after removal of the foreign matter such as coke-dust and tars (as by the distillation operation mentioned) that is, to the unstabilized distillate oil. Further, the initial sulphur oil in tank 26 and the unstabilized distillate oil usually contain substances such as mercaptans and pyridines which impart to the oil an undesirable odor and may tend to render the ultimate product oils unstable. Hence, according to the more satisfactory procedure for making the refined oils of the invention, it is preferred to (1) remove from the initial sulphur oil of tank 26 the foreign matter such as coke and tars as by distillation; (2) simultaneously fractionate the initial oil during the distillation operation, (since different fractions, e. g. a light fraction or a heavy fraction, are suited for different uses in the arts); (3) stabilize the fractions (to remove mercaptans, pyridines, etc.); and (4) then treat the stabilized oils or if desired the oils in unstabilized condition to produce the refined or purified or concentrated or extracted high sulphur oils.

Removal of foreign matter from the raw condensate of tank 26 and splitting of the condensate into two or more fractions may be done by distillation. For this purpose, oils from tank 26 are run into still 30 through line 38. The distillation operation may be carried out in any suitable still, preferably one provided with equipment for collecting separate fractions of distillate. It will be understood distillation of the raw condensate is principally for two purposes, first, to remove coke and tars from the oil, and second, to produce preferably two fractions, one having a relatively low boiling point range, and another having a higher boiling point range. Distillation may be effected for example by externally heating of still 30. If desired, distillation of the crude condensate may also be accomplished at temperatures lower than those hereinafter mentioned by introducing live steam directly into the oil body while externally heating the same. Distillation may also be effected, though possibly less desirably, by superheated live steam, using steam at slightly above atmospheric pressure and heated to say 225-250° F. before introduction into the oil. Vacuum distillation may be employed if desired.

Still 30 may be operated to produce a first cut including all the oils distilling over at temperatures up to about 350° F. Vapors generated within this temperature range are liquefied in condenser 43, and are run into receiver 50. This relatively low boiling fraction may for example constitute approximately 20% by volume of the raw initial sulphur oil condensate fed into still 30. When removal of these low boiling fractions from the oil in still 30 is substantially complete, the temperature is raised to distill over oils having boiling points ranging from about 350° F. up to about 650° F. Vapors formed are condensed in cooler 43, and may be recovered in receiver 51. This high boiling fraction may comprise for example 60-66% by weight of the raw condensate introduced into still 30. Approximately 10% by weight of the original raw condensate withdrawn from tank 26 may remain in still 30 as a coke or asphalt residue, and around 5-10% by weight of the original raw condensate may be lost in the distillation operation as uncondensable vapors and gases. The low boiling cut recovered in receiver 50 usually contains a slightly higher percentage of sulphur than the higher boiling fraction collected in receiver 51. If desired, all of the vapors evolved in still 30 may be condensed and collected in a single receiver instead of in two receivers as 50 and 51. In this situation, the condensate collected corresponds in a general way with the condensate collected in tank 26 except that foreign matter, such as coke-dust and tars, has been removed.

As indicated, the hereinafter described sulphur constituent separation treatment may be applied directly to the raw condensate collecting in tank 26, or to the fractions collecting in receivers 50 and 51, or to the condensate collecting in a single receiver used in place of receivers 50 and 51. The oils in this condition, however, apparently contain substances such as pyridines and mercaptans which impart to the oils undesirable odors and which may tend to render the final product somewhat unstable on standing. Accordingly, it is preferred to further treat the above mentioned oils to stabilize the same and remove odors. This may be accomplished by treating the oils with a solution of sulphuric acid or caustic soda or both. When employing caustic alkali, as is preferred, the oil may be agitated with a 20% caustic soda solution at temperatures of about 190° F. until reaction appears complete. The reaction products are allowed to settle, and are withdrawn. The oil may then be washed with water to remove traces of alkali, and brightened as by blowing with air.

The oils are preferably stabilized by treating with relatively low concentration sulphuric acid, say about equal volume, separating reaction products, and washing the oils with water and alkali to remove traces of acid. For this stabilization treatment, it is preferred to use acid of concentration not in excess of about 60% $H_2SO_4$, since acid of this or less concentration, while suitable for removing odor imparting substances, does not appear to have appreciable effect on the valuable sulphur compounds which should be left in the oils at this stage and recovered by the subsequent sulphur constituent separation treatment. If desired, the oils may be stabilized by using acid of greater concentration, say up to about 93.2% $H_2SO_4$ (66° Bé.), in which case the amount of stronger acid should not desirably exceed about 7% by volume of the oil treated.

Treatment of the oils with either caustic alkali or sulphuric acid notably improves the odor and increases the stability of the oils. In some instances, it is desirable to subject the oils to treatment with both caustic alkali and sulphuric acid. In this case, after subjecting the oils to the caustic soda treatment noted above, and removing the alkali extract, the oils are washed with water to remove the alkali, and then treated with one or more washes of equal volume of dilute sulphuric acid, for example 30% $H_2SO_4$. The final oil products may be washed with water to remove traces of acid, and then brightened by blowing with air, or other methods.

In the case of a raw condensate from tank 26, or where the foreign matter is removed from the condensate of tank 26, as by distillation and collection of all the distillate in a single receiver, the stabilization treatment may be applied as desired.

The oils stabilized, for example as mentioned above, are sulphur bearing mineral oils, light bodied, and have a relatively high sulphur content, substantially all of which is in strong chemical combination. It appears substantial amounts of the contained sulphur is present as alkyl sulphides and possibly also some disulphides, and other sulphur bearing compounds. The sulphur content of the oils at this stage may vary from about 3 to about 22%, and on standing the oils do not become turbid or deposit sulphur. The oils are a light straw color. The specific gravity of a representative oil is about 0.98. The viscosity is low, about 32 to 34 Saybolt at 100° F.

The oils in unstabilized and stabilized condition appear to comprise mixtures of the sought for sulphur constituents, and other sulphur and non-sulphur constituents. The ultimate refined oils of the invention are obtained by selectively separating the sought for sulphur constituents from other sulphur and non-sulphur constituents. In accordance with the invention, this sulphur constituent separation may be effected for example by treatment of unstabilized or stabilized oils with relatively strong sulphuric acid which does not appear to react to any great extent with the non-sulphur constituents but which does appear to have the property of dissolving or combining with the sought for sulphur constituents and forming an acid sludge containing such sulphur constituents.

On treatment of raw condensate or any of the fractions mentioned, in stabilized or unstabilized condition, with acid, as in tank or vat 55, there is formed a sludge which contains substantially all of the desired sulphur constituents of the oil. The preferred procedure for carrying out the sulphur constituent separation treatment is as follows. The particular oil being treated with sulphuric acid of concentration preferably from about 80% to about 93.2% $H_2SO_4$ in two equal dumps, each dump of acid representing about 50% by volume of total acid used. The first dump of acid is added with agitation to the initial sulphur oil in tank or vat 55. If heat of reaction is severe, the reaction mass may be cooled, since the temperature should preferably not exceed about 120° F. The acid is added to the oil gradually say over a period of about 15 minutes more. The reaction mass is allowed to settle for say 30 minutes or more, after which time the acid sludge formed is withdrawn from tank 55 by gravity through line 57 and fed into hydrolyzer 58. The acid insoluble oil from the first dump remaining in tank 55 is treated with a second dump of acid (about 50% by volume of the total acid used) in the same manner as with the first dump, allowed to settle, and the acid sludge withdrawn through line 57 and added to the sludge already in hydrolyzer 58 from the first dump. If desired, all of the acid used to treat the oil may be added thereto in one dump, although it is preferred to employ two or more dumps since this procedure brings about more complete extraction of the desired sulphur constituents from the oil. The sludge in hydrolyzer 58 is treated with about twice the volume of water and is hydrolyzed, resulting in breaking up of the sludge and a separation of the sulphur oil constituents extracted out of the stabilized or unstabilized oil from the acid which was used to effect this extraction of sulphur constituents from the stabilized or unstabilized oil. During hydrolysis, the temperature is preferably not permitted to exceed about 130° F. The oil formed on hydrolysis of the sludge is generally lighter than the acid which settles and forms a layer of acid in the bottom of the hydrolyzer. After settling, the acid is drawn off through line 59, and the oil discharged through pipe 60 is preferably given a light wash for example with caustic alkali, or several washes with water to neutralize traces of acid which may remain in the oil on account of imperfect separation of oil and acid in the hydrolyzer. The oil may be brightened by filtering. Oils recovered in this way are the oils referred to herein as the refined oils, or purified or concentrated or extracted oils.

The sulphuric acid used should be of strength desirably not less than about 70% $H_2SO_4$, although it is preferred to use stronger acids. Satisfactory extraction may be obtained by utilizing 93.2% acid (66° Bé.), although indications are that acid of around 85% strength is more selective than the 93.2% acid. The amount of acid used to bring about separation of the sought for sulphur constituents from the undesired mostly non-sulphur constituents depends upon the amount of sulphur constituents contained in any given oil. As to the total amount of acid used in the separation operation, it is preferred to employ acid in amount corresponding to not less than about one volume of acid to one volume of refined sulphur oil, since experience indicates about such amount of acid is necessary to dissolve or extract the sulphur constituents from the initial stabilized or unstabilized oil. That is, for any given volume of the refined high sulphur oil recovered, preferably not less than about an equal volume of acid was used in one or more dumps to treat the stabilized or unstabilized oil to bring about separation of the sulphur constituents from the non-sulphur constituents. In practice, the amount of acid needed may be determined by taking a sample of the oil and adding thereto successive small amounts of acid until on further addition of sulphuric acid to the sample, further solution or dissolving of the oil ceases.

On hydrolysis of the acid sludges produced by the sulphuric acid treatment of stabilized or unstabilized oils generally 85–90% as much oil is recovered as was removed from the stabilized or unstabilized oils on treatment with sulphuric acid, and the refined oils recovered on hydrolysis are as a rule considerably higher in sulphur content than the unextracted stabilized or unstabilized oils. For example, on treating a heavy fraction, stabilized by treatment with caustic alkali and weak sulphuric acid and boiling approximately within the range 350–650° F. and containing about 11.6% sulphur, with about twice the volume of 93.2% sulphuric acid (66° Bé.), the sulphur content of the unreacted oil after separation of the acid sludge formed was about 1.9%, and the sulphur content of the refined extracted oil obtained on hydrolysis of the acid sludge was about 19%. In another instance, on treating an unstabilized heavy fraction, boiling approximately within the range 350–650° F. and containing about 2.8% sulphur, with about one volume of 93.2% sulphuric acid, the sulphur content of the unreacted oil after separation of the acid sludge formed was about 0.6%, and the sulphur content of the refined extracted oil obtained on hydrolysis was about 8.9%. On treating an unstabilized light fraction, boiling at temperatures less than about 350° F. and containing about 18% sulphur, with about one volume of 93.2% sulphuric acid, the sulphur content of the unreacted oil after separation of the acid sludge formed was about 5.3% and the sulphur content of the refined extracted oil obtained on hydrolysis of the acid sludge was about 23%.

Instead of decomposing the acid sludge by heating as described in connection with the drawing, the original acid sludge may be subjected to hydrolysis as by steaming with live steam, for say an hour, until separation of weak acid (sludge acid) and an upper acid tar layer takes place. The weak acid may be drawn off and the resulting acid tar or sludge material decomposed by heating as in a retort 11. The oily distillate may be taken in two or more cuts if desired, although it is preferred to collect the oily distillate as in a tank 26. During steaming of the acid sludge a light colored distillate may be recovered in a suitable condenser. This distillate and the condensate collected in tank 26 may be separately treated as already described to produce high sulphur refined oils, or may be combined and then so treated.

We claim:

1. The method for making a sulphur bearing oil comprising destructively decomposing by heating sludge material, resulting from treatment of light hydrocarbon oil distillates containing not less than about 0.15% sulphur with sulphuric acid, to form a hot gas mixture containing sulphur dioxide, water and hydrocarbon vapors, cooling the gas mixture to form a condensate containing water and oil, separating oil from water, distilling the oil, recovering the condensate, treating the condensate with sulphuric acid of concentration not less than about 70% $H_2SO_4$, and in quantity sufficient to effect extraction of sulphur bearing oil constituents from said condensate, separating the resulting sludge reaction product from the condensate, subjecting said resulting sludge to hydrolysis to separate sulphur oil and acid, and recovering sulphur oil from the reaction product resulting from said hydrolysis.

2. The method for making a sulphur bearing oil comprising destructively decomposing sludge material, resulting from sulphuric acid treatment of light hydrocarbon oil distillates containing not less than about 0.15% sulphur, by heating to temperatures of not more than about 600° F. to decompose the sludge and form a hot gas mixture containing sulphur dioxide, water and hydrocarbon vapors, cooling the gas mixture to about normal temperature to form a condensate containing water and oil, separating water from oil, distilling the oil, recovering as condensate a light fraction boiling below about 350° F., treating the fraction with sulphuric acid of concentration not less than about 70% $H_2SO_4$, and in quantity sufficient to effect extraction of sulphur bearing oil constituents from said condensate, separating the resulting sludge reaction product from the fraction, subjecting said resulting sludge to hydrolysis to separate sulphur oil and acid, and recovering sulphur oil from the reaction product resulting from said hydrolysis.

3. The method for making a sulphur bearing oil comprising destructively decomposing sludge material, resulting from sulphuric acid treatment of light hydrocarbon oil distillates containing not less than about 0.15% sulphur, by heating to temperatures of not more than about 600° F. to decompose the sludge and form a hot gas mixture containing sulphur dioxide, water and hydrocarbon vapors, cooling the gas mixture to about normal temperature to form a condensate containing water and oil, separating water from oil, distilling the oil, recovering as condensate a heavy fraction boiling substantially within the range 350° F. and 650° F., treating the fraction with sulphuric acid of concentration not less than about 70% $H_2SO_4$, and in quantity sufficient to effect extraction of sulphur bearing oil constituents from said fraction, separating the resulting sludge reaction product from the fraction, subjecting said resulting sludge to hydrolysis to separate sulphur oil and acid, and recovering sulphur oil from the reaction product resulting from said hydrolysis.

4. The method for making a sulphur bearing oil comprising destructively decomposing by heating sludge material, resulting from sulphuric acid treatment of hydrocarbon oil distillates obtained from sulphur containing crudes, to form a hot gas mixture containing sulphur dioxide, water and hydrocarbon vapors, cooling the gas mixture to form a condensate containing water and oil, separating water from oil, treating the oil with sulphuric acid of concentration not less than about 70% $H_2SO_4$ and in quantity sufficient to effect extraction of sulphur bearing oil constituents from said oil, separating the resulting sludge reaction product from said oil, subjecting said resulting sludge to hydrolysis to separate sulphur oil and acid, and recovering sulphur oil from the reaction product resulting from said hydrolysis.

5. The method for making a sulphur bearing oil comprising destructively decomposing by heating sludge material, resulting from sulphuric acid treatment of hydrocarbon oil distillates obtained from sulphur containing crudes, to form a hot gas mixture containing sulphur dioxide, water and hydrocarbon vapors, cooling the gas mixture to form a condensate containing water and oil, separating water from oil, distilling the oil, recovering the condensate, treating the condensate with sulphuric acid of concentration not less than about 70% $H_2SO_4$ and in quantity sufficient to effect extraction of sulphur bearing oil constituents from said condensate, separating the resulting sludge reaction product from the condensate, subjecting said resulting sludge to hydrolysis to separate sulphur oil and acid, and recovering sulphur oil from the reaction product resulting from said hydrolysis.

6. The method for making a sulphur bearing oil comprising destructively decomposing by heating sludge material, resulting from sulphuric acid treatment of hydrocarbon oil distillates obtained from sulphur containing crudes, to form a hot gas mixture containing sulphur dioxide, water and hydrocarbon vapors, cooling the gas mixture to form a condensate containing water and oil, separating water from oil, distilling the oil, recovering as condensate a heavy fraction boiling substantially within the range 350° F. and 650° F., treating the fraction with sulphuric acid of concentration not less than about 70% $H_2SO_4$ and in quantity sufficient to effect extraction of sulphur bearing oil constituents from said fraction, separating the resulting sludge reaction product from the said fraction, subjecting said resulting sludge to hydrolysis to separate sulphur oil and acid, and recovering sulphur oil from the reaction product resulting from said hydrolysis.

7. The method for making a sulphur bearing oil comprising destructively decomposing by heating sludge material, resulting from treatment with sulphuric acid of light hydrocarbon oil distillates containing not less than about 0.15% sulphur, to form a hot gas mixture containing sulphur dioxide, water and hydrocarbon vapors, cooling the gas mixture to form a condensate containing water and oil, separating water from oil, treating the oil with sulphuric acid of concentration not less than about 70% $H_2SO_4$ and in quantity sufficient to effect extraction of sulphur bearing oil constituents from said oil, separating the resulting sludge reaction product from said oil, subjecting said resulting sludge to hydrolysis to separate sulphur oil and acid, and recovering sulphur oil from the reaction product resulting from said hydrolysis.

HENRY F. MERRIAM.
GEORGE W. CUPIT, Jr.